March 25, 1969     T. H. LAVENGOOD     3,434,196
METHOD OF MAKING A UNIVERSAL JOINT
Filed March 30, 1967
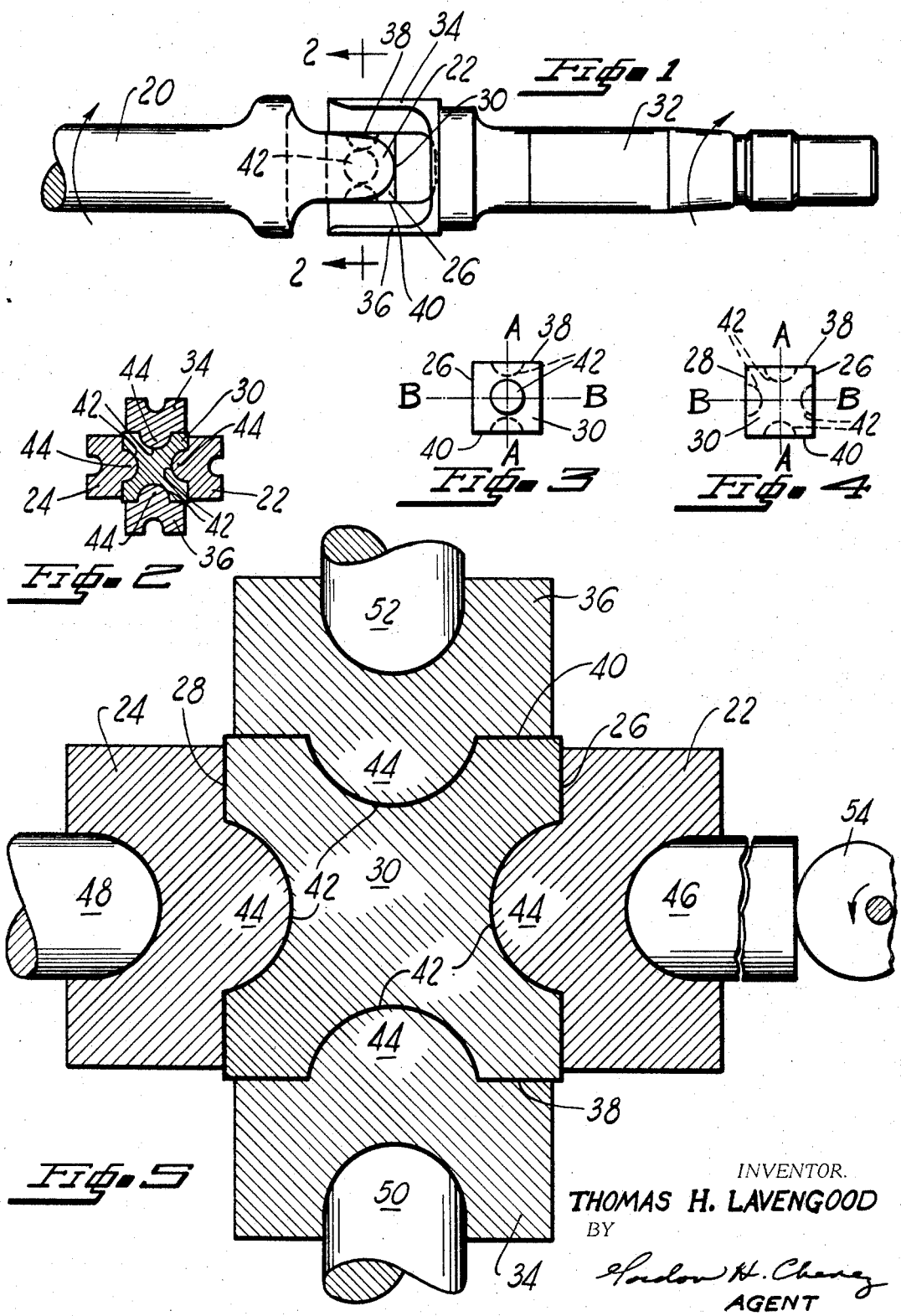
INVENTOR.
THOMAS H. LAVENGOOD
BY
AGENT United States Patent Office 3,434,196
Patented Mar. 25, 1969

3,434,196
METHOD OF MAKING A UNIVERSAL JOINT
Thomas H. Lavengood, South Bend, Ind., assignor to The Bendix Corporation, a corporation of Delaware
Filed Mar. 30, 1967, Ser. No. 627,079
Int. Cl. F16d 3/34; B23p 11/00
U.S. Cl. 29—437                                      5 Claims

ABSTRACT OF THE DISCLOSURE

A motion transmitting universal joint having driving and driven rotatable elements provided with respective first and second integral yoke portions pivotally connected to a coupling for movement about two angularly disposed axes wherein the coupling is defined by a cube member having first and second pairs of aligned curved portions defined by opposite faces thereof which act as dies for the respective yoke portions which are simultaneously upset as by coining to pivotally secure the first and second yoke portions to the coupling.

Background of the invention

The present invention relates to a method of making a universal joint for drivably connecting two rotatable shafts having intersecting axes.

In general, existing universal joints are not entirely satisfactory in that a relatively large number of component parts are required for a given universal joint assembly which results in a correspondingly high cost of manufacture as well as high labor costs in the assembly of the universal joint. Furthermore, repair of such universal joints becomes a significant expense by virtue of parts replacement and/or labor involved in assembly and disassembly of the universal joint. The complexity of component parts of the universal joints does not lend the same to an automated assembly technique as will be recognized by those persons skilled in the art. Furthermore, in many cases the relatively high cost of a universal joint assembly makes repair of the same economically feasible in contrast to replacing a defective assembly with a new universal joint although latter remedy is preferable for obvious reasons.

Summary of the invention

The present invention is a relatively simple universal joint assembly which has three easily fabricated sections capable of being joined by a simple step coining operation to provide a permanent universal joint assembly.

It is an object of the present invention to provide a simply constructed universal joint which has a minimum number of component parts adapted to be easily and quickly assembled by automated machinery thereby facilitating mass production.

It is another object of the present invention to provide a simply constructed universal joint which is relatively inexpensive thereby rendering the use of the same economically feasible in applications where cost is a prohibitive factor.

It is an important object of the present invention to provide a method of making a relatively inexpensive universal joint which makes replacement of a defective universal joint by a new joint economically feasible in contrast to repair of the same.

It is an object of the present invention to provide a method of forming a universal joint assembly simply and quickly.

Brief description of the drawings

FIGURE 1 represents a plan view of a universal joint embodying the present invention;

FIGURE 2 represents a sectional view taken on line 2—2 of FIGURE 1;

FIGURE 3 represents an end view of the centrally located block of FIGURE 2 showing the coining die characteristics thereof;

FIGURE 4 represents a side view of the centrally located block of FIGURE 2;

FIGURE 5 represents the method of upsetting the universal joint yoke portions to fill the depressions of the centrally located die block thereby forming a flexible joint capable of universal motion.

Description of the preferred embodiment

Referring to FIGURE 1, the present invention includes a rotatable shaft 20 having a pair of parallel, spaced apart yoke arms 22 and 24 which slidably bear against opposite faces 26 and 28, respectively, of a block 30 generally indicated in cube form and formed from a relatively hard material compared to that of the yoke arms 22 and 24. A second rotatable shaft 32 is provided with a pair of parallel, spaced apart yoke arms 34 and 36 which slidably bear against opposite faces 38 and 40, respectively, of block 30. Each of the faces 26, 28, 38 and 40 is provided with a centrally located curved die depression 42. The depressions 42 in each pair of opposite faces are aligned on a common axis A—A or B—B which, in the preferred embodiment shown, intersects at ninety degrees. However, it will be understood that one pair of aligned depressions 42 relative to the other pair of aligned depressions 42 may be offset to a reasonable degree so that the axes do not intersect.

The yoke arms 22 and 24 are each provided with an extruded curved portion 44 which slidably mates with associated depression 42 in faces 26 and 28, respectively, of block 30 thereby pivotally securing shaft 20 to block 30 for movement about the axis B—B. The yoke arms 34 and 36 are each provided with an extruded curved portion 44 which slidably mates with associated depression 42 in faces 38 and 40 of block 30 thereby pivotally securing shaft 32 to block 30 for movement about the axis A—A.

Referring to FIGURE 1, it will be noted that up or down angular movement of shaft 32 relative to shaft 20 results in yoke arms 34 and 36 with block 30 clamped therebetween pivoting about the axis B—B whereas angular movement of shaft 32 at a right angle to the plane of FIGURE 1 results in yoke arms 34 and 36 pivoting on block 30 about axis A—A. Likewise, universal motion of shaft 20 relative to shaft 32 is permitted by pivotal movement of yoke arms 22 and 24 and block 30 clamped therebetween about axis A—A when shaft 20 is angularly moved perpendicular to the plane of FIGURE 1 and by pivotal movement of yoke arms 22 and 24 on block 30 about axis B—B when shaft 20 is angularly displaced in the plane of FIGURE 1.

The method of making the above described universal joint is simple and quick and employs the following steps. The block 30 which may be of metal or other suitable relatively hard material is inserted between yoke arms 22, 24 and 34, 36 which slidably engage associated faces 26, 28 and 38, 40, respectively. The resulting assembly is placed in a conventional press, not shown, with shafts 20 and 32 in axial alignment and clamped in position by suitable conventional fixtures, not shown, mounted on the press bed to thereby align yoke arms 22 and 24 with a pair of oppositely disposed, axially movable die members 46 and 48, respectively, and yoke arms 34 and 36 with a pair of oppositely disposed, axially movable, die members 50 and 52, respectively.

The abovementioned press is conventional in structure and operation as will be recognized by those persons skilled in the art and is not therefore shown or described in detail. For example, the press may be of the cam operated type wherein each of the die members 46, 48, 50 and 52 is engaged by an associated rotatable cam 54, only one of which is shown, suitably contoured to actuate its associated die member axially under sufficient force to thereby simultaneously upset yoke arms 22, 24, 34 and 36 into the respective depressions 42 on faces 26, 28, 38 and 40.

To the above end, the press is energized to rotate cams 54 simultaneously thereby driving die members 46, 48, 50 and 52 into engagement with yoke arms 22, 24, 34 and 36 respectively which are pentrated to the extent required to coin the yoke arms which are of relatively soft material compared to that of block 30 into depressions 42. Preferably, the depressions 42 as well as the ends of die members 46, 48, 50 and 52 are provided with spherical surfaces which produce similar curved extruded portions 44. However, it is recognized that the depressions 42 and/or die members 46, 48, 50 and 52 may take other forms as will be recognized by those skilled in the art.

The die members 46, 48, 50 and 52 are retracted in response to movement of cams 54 whereupon the universal joint assembly is released from the clamping fixtures, not shown, to permit removal of the assembly from the press.

It is recognized that the yoke arms 22, 24, 35 and 36 may tend to spring away from the block 30 to a certain degree as a result of material resiliency of the yoke arms 22, 24, 34 and 36 when the die members 46, 48, 50 and 52 are removed. However, to eliminate any undesired clearance between the block 30 and yoke arms engageable therewith, a yoke arms 22, 24, 34 and 36 may be subjected to suitable heat treatment as a final step to thereby draw the yoke arms into engagement with block 30 with or without preload as desired.

Various changes and modifications from the above described preferred embodiment of the present invention may be made by htose persons skilled in the art without departing from the scope of the present invention as defined by the following claims.

I claim:
1. A method of making a universal joint assembly comprising the steps of:
   providing yoke means having spaced apart arm portions;
   providing a die block of relatively hard material compared to said arm portions and having aligned spaced apart curved die portions formed thereon;
   positioning said yoke means on said die block with the spaced apart arm portions of said yoke means overlapping said aligned die portions; and
   upseting a portion of each of said arm portions against the curved die portions adjacent thereto pivotally secure said yoke means to said die block.

2. A method of making a universal joint assembly comprising the steps of:
   providing yoke means having spaced apart arm portions;
   providing a die block of relatively hard material compared to said arm portions and having aligned spaced apart spherical depressions formed therein;
   positioning said yoke means on said die block with the spaced apart arm portions of said yoke means overlapping said aligned part spherical depressions; and
   extruding a portion of said arm portions of said yoke mean into said part spherical depresions adjacent thereto pivotally secure said yoke means to said die block.

3. A method of making a universal joint assembly comprising the steps of:
   providing first and second yoke members each having spaced apart arm portions;
   providing a die block of relatively hard material compared to said arm portions and having first and second pairs of aligned curved die portions formed thereon with the axes of alignment thereof arranged in mutually perpendicular relationship;
   positioning said first and second yoke members on said die block in oppositely extending relationship with the spaced apart arm portions of said first yoke member overlapping said first pair of aligned curved die portions and the spaced apart arm portions of said second yoke member overlapping said second pair of aligned curved die portions;
   supporting said first and second yoke members and attached die block between and in alignment with first and second pairs of spaced apart axially powered die members adapted to engage the arm portions of said first and second yoke members, respectively; and
   actuating said first and second pairs of axially powered die members simultaneously into engagement with the respective arm portions of said first and second yoke members to thereby upset said arm portions against the respective curved die portions adjacent thereto thereby pivotally securing said first and second yoke members to said die block.

4. A method of making a universal joint assembly comprising the steps of:
   providing yoke means having spaced apart arm portions;
   providing a die block of cube form having aligned curved die portions formed on opposite faces thereof;
   positioning said yoke means on said die block with the spaced apart arm portions thereof overlapping said curved die portions;
   supporting said yoke means and attached die block betwen an din alignment with spaced apart curved die members; and
   actuating said spaced apart curved die members into engagement with said spaced apart arm portions to simultaneously upset said arm portions against the die portions adjacent thereto thereby coining a pivotal connection permanently securing said yoke means to said die block.

5. A method of making universal joint assembly as claimed in claim 1 and further including a final step of:
   subjecting said yoke means to heat treatment to permanently deflect said arm portions toward said die block thereby minimizing clearance between said die block and arm portions pivotally supported thereon.

References Cited
UNITED STATES PATENTS

| | | | |
|---|---|---|---|
| 2,213,448 | 9/1940 | Morton | 29—438 |
| 2,238,335 | 4/1941 | MacGregor | 64—17 |
| 2,355,781 | 8/1944 | Cardinal | 29—434 X |
| 2,624,907 | 1/1953 | Graham | 29—432 X |
| 3,045,455 | 7/1962 | Potgieter | 64—17 |

THOMAS H. EAGER, *Primary Examiner.*

U.S. Cl. X.R.

29—432; 64—17